Sept. 11, 1962     H. L. PENBERTHY     3,053,517
APPARATUS AND METHOD OF HOMOGENIZING GLASS
Filed Nov. 21, 1958

INVENTOR
*Harvey L. Penberthy*

BY *Diggins & LeBlanc*
ATTORNEYS 3,053,517
APPARATUS AND METHOD OF
HOMOGENIZING GLASS
Harvey L. Penberthy, 4301 6th Ave. S., Seattle 8, Wash.
Filed Nov. 21, 1958, Ser. No. 775,517
14 Claims. (Cl. 259—103)

This invention relates to the homogenization of glass and more particularly relates to an apparatus and method of homogenizing glass which is adapted to usage in a variety of environments including the homogenization of colored glass.

Molten glass in a furnace or forehearth tends to be non-uniform in temperature and may be inhomogeneous. The portions of such glass next to the bottom and side walls tend to be cooler and more sluggish than the remainder of the glass. The hotter, less viscous glass flows more readily than the cooler, more sluggish marginal portions of the glass in a channel formed by the latter. Other factors may cause temperature differences and differences of the viscosity between longitudinal portions or component streams of the complete stream or body of glass in the furnace or forehearth. Some of the glass may be contaminated by clay that has been eroded and washed from the walls of the furnace or forehearth. Different longitudinal portions of the glass stream or body may be of different compositions. Longitudinal streaks or thin streams of contaminated glass or of glass composition different from the adjacent glass, or inadequately fused glass ingredients or of other foreign matters tend to persist in the glass so as to be included in the charge fed from the forehearth or furnace. In consequence, the charges of glass obtained may be defective and the glass articles made therefrom will likewise be defective and may be unsuitable for their intended use.

In the manufacture of colored glass in a forehearth or other moving stream, the colorant may be introduced into the feeder in the form of a molten concentrated glass which flows from a tank located above the feeder immediately adjacent its attachment to the main glass furnace. Such an arrangement is illustrated in the patent to Brosse, No. 2,115,408. In other systems, particles of colorant, either in chunk or frit form, are introduced into the moving glass. Since the glass moving through the feeder follows substantially streamlined flow conditions, the colorant, whether chunk, frit or molten, tends to be embodied in the moving stream of glass as concentrated color streaks. In order to distribute the colorant more uniformly in the feeder glass a wide variety of stirring equipment has been utilized ranging from single rotating impellers to complex combinations of screw type impellers. While the specific mechanical arrangements have differed, all of the commonly used homogenizers have attempted to subject the glass to a more or less vigorous and more or less prolonged stirring action. The aforementioned patent to Brosse shows one such stirring arrangement while a second arrangement is shown in Patent No. 2,467,809 to Cannon.

According to the present invention it has now been found that it is possible to achieve a remarkable degree of glass homogenization through the use of a unique stirring arrangement which is performed upon a moving stream of glass while it is confined in a relatively narrow channel. In order to achieve this homogenization the glass is caused to flow serially through a plurality of stirrers arranged one after the other in a feeder or forehearth with the stirrers being arranged to simultaneously create a vertical motion in the glass and a transverse glass stream which strikes the adjacent side walls of the feeder or forehearth to produce what might be termed a glass splitting action. The stirrer impellers are arranged so that their paths of rotation overlap and the impeller ends move in the same direction at the area of overlap. That is to say, the impellers are rotated in opposite directions.

In addition to this, the impellers are provided with a means for creating the vertical glass motion. In one case this may be provided by imparting pitch to the impellers while in an alternative arrangement, the axes of rotation of the impellers are cocked with respect to one another. In both cases, the result is to produce a glass which is homogeneous and/or a glass having colorant uniformly and homogeneously distributed therein.

It is accordingly a primary object of the present invention to provide an improved apparatus and method of homogenizing glass.

It is another object of the invention to provide an improved method and apparatus for homogenizing glass which is adapted to use in a variety of environments and which is useful for evenly distributing colorant throughout a colored glass.

It is another object of the invention to provide an improved method and apparatus of homogenizing glass utilizing a unique arrangement of stirrer type impellers in a relatively narrow flow channel so that the glass is serially subjected to the action of the impellers as it flows through the channel and is subjected to both a transverse and vertical movement.

These and other objects and advantages of the invention will become more apparent upon reference to the following specification and claims and appended drawings wherein:

Figure 1:
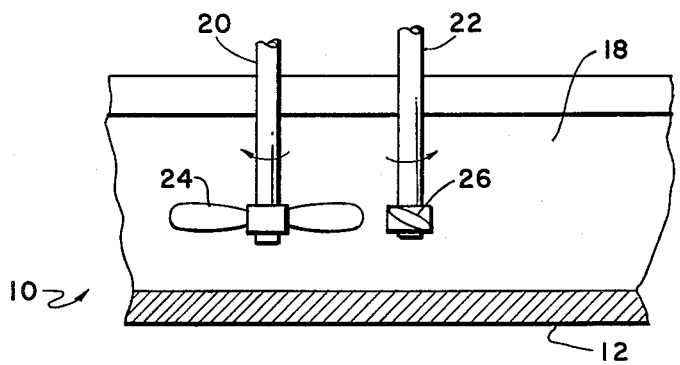
FIGURE 1 is a vertical section through a glass feeder or forehearth showing impellers mounted therein according to one embodiment of the present invention.
Figure 2:
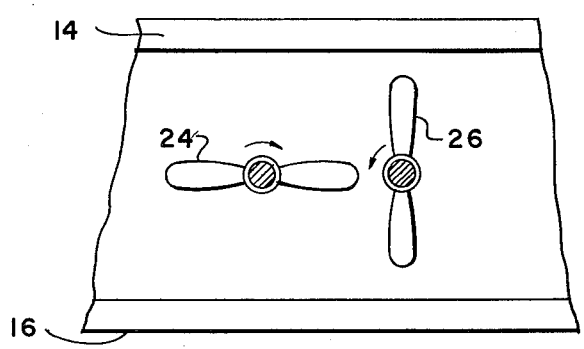
FIGURE 2 is a plan view of the feeder or forehearth of FIGURE 1.

Referring to FIGURES 1 and 2 there is seen a feeder or forehearth 10 having a bottom 12 and sides 14 and 16. A mass of molten glass 18 flows through the feeder. Extending into the molten mass of glass 18 are a pair of parallel stirrer shafts 20 and 22 which are connected to suitable drive means, not shown. Such drive means might be electric motors, pulley and belt, or chain arrangements, or any of the other equivalent means well known to those skilled in the art. Each shaft 20 and 22 carries a propeller type impeller 24 and 26 which is provided with a pitch as is seen in the view of impeller 26 in FIGURE 1. The shafts 20 and 22 are rotated in opposite directions as indicated by the arrows and are driven at the same speed. The impellers 24 and 26 are synchronized 90° out of phase with one another as shown in FIGURE 2. As will also be seen in FIGURE 2, the paths of the impellers 24 and 26 have a considerable overlap.

The pitch of the impellers 24 and 26 is so arranged with respect to their directions of rotation that both blades preferably tend to impart vertical motion to the glass in the same direction, i.e., either upwardly or downwardly.

As the glass mass 18 flows serially through the impellers 24 and 26 it is subjected to a vigorous vertical pumping action while at the same time the overlapping portions of the impellers move in the same direction to create a transverse flow of glass into the immediately adjacent side wall of the feeder. Thus, referring to FIGURE 2, with the rotation of the shafts in the directions shown, a transverse current is created toward the lower feeder wall 16 and as the glass strikes that wall at relatively high velocity a vigorous splitting action is effectuated.

The relationship between the width of the feeder and the size of the impellers is such that impellers are capable of creating a transverse current of glass which strikes the feeder wall with considerable force. Also, the impellers must be mounted adjacent the bottom of the feeder so that the vertical movement of the glass is capable of scouring any sluggish or colder glass from the feeder bottom.

Where the impellers are quite small in relation to the width of the feeder the transverse current loses glass splitting velocity prior to the time that it reaches the side wall or else does not even extend to the side wall. Under such circumstances no glass splitting action occurs and the efficacy of the homogenization deteriorates. Similarly, where the impellers are not provided with overlap and a pitch to impart the vertical motion to the glass the mixing is inadequate and does not provide satisfactory homogenization. The overlap between the blades is effective not only in enhancing the vertical pumping action, but also is essential to the splitting effect.

Figure 3:
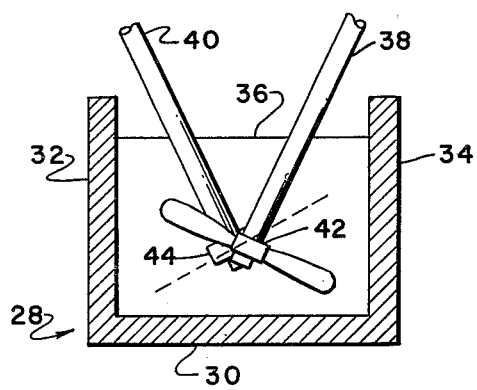
FIGURE 3 is a vertical section through a feeder or forehearth showing stirrers mounted therein according to another embodiment of the invention.

Referring to FIGURE 3 there is shown another embodiment of the invention mounted in a feeder 28 having a bottom 30 and sides 32 and 34. A glass mass 36 flows through the feeder through serially disposed shafts 38 and 40.

In the embodiment of the invention shown in FIGURE 3, the shafts 38 and 40 are provided with impellers 42 and 44 which need not be provided with pitch as were the impellers in the embodiment of the invention illustrated in FIGURES 1 and 2. In this embodiment of the invention, however, the impeller shafts 38 and 40 are disposed at an angle to one another in order to produce the vertical glass action which was obtained by the pitch in the embodiment of the invention of FIGURES 1 and 2. The shafts 38 and 40 are again rotated in opposite directions by suitable drive means, not shown, and the impellers 42 and 44 are again disposed 90° out of phase with one another. The impellers overlap as in the embodiment of the invention in FIGURES 1 and 2 and are again located in proximity to the sides and bottom of the feeder for the same purposes described hereinabove. While the angle between the impeller shafts in FIGURE 3 is shown as being in a transverse plane across the feeder, it is also comprehended by the invention that the shafts may be canted or cocked in a longitudinal plane along the length of the feeder or in other directions.

The homogenization apparatus and method of this invention may be applied to existing feeders or forehearths without material alteration and thus presents an opportunity for improving the quality of glass products in an innumerable variety of glass manufacturing installations. The method and apparatus may be used very advantageously in the coloring of glass and equally well in the production of a wide variety of glass articles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

This application is a continuation in part of applicant's copending application Serial No. 494,381, filed March 15, 1955, now abandoned.

What is claimed and desired to be secured by United States Letters Patent is:

1. An apparatus for homogenizing glass comprising a flow channel for molten glass, a first impeller in said flow channel between the side walls thereof, a second impeller in said flow channel between the side walls thereof and down stream of said first impeller, and means for rotating said impellers in opposite directions, said impellers being so constructed as to exercise a vertical pumping action and create a transverse flow of said glass into one of said side walls, the paths of movement of said impellers being overlapping.

2. An apparatus according to claim 1 wherein said impellers are pitched to create said vertical pumping action, both impellers being pitched to create vertical glass motion in the same direction.

3. An apparatus according to claim 1 wherein the axes of rotation of said impellers are inclined with respect to one another.

4. Apparatus as defined in claim 1 wherein said flow channel is the forehearth of a glass furnace.

5. Apparatus as defined in claim 1 wherein said impellers are sufficiently close to the bottom of said flow channel so that the resulting vertical movement of glass effected by means of the vertical pumping action is capable of scouring sluggish and cold glass from the bottom of the channel.

6. Apparatus as defined in claim 1 wherein the spacing between the sidewalls of said channel and the ends of said impeller blades is sufficient to permit glass flowing transversely into said one sidewall to strike said one sidewall with glass splitting velocity.

7. An apparatus for mixing glass including a flow channel for molten glass, a first impeller in said flow channel between the side walls thereof, a second impeller in said flow channel between the side walls thereof and down stream of said first impeller, said impellers being of such diameter that the impeller ends approach said side walls closely, and means for rotating said impellers in opposite directions, said impellers being so constructed that they exercise a vertical pumping action on the glass while at the same time creating a transverse flow of glass into the side wall of said channel, the paths of movement of said impellers overlapping.

8. An apparatus according to claim 7 wherein said impellers are pitched to produce said vertical pumping action.

9. An apparatus according to claim 7 wherein the axes of rotation of said impellers are inclined with respect to one another.

10. Apparatus for homogenizing glass comprising a flow channel for molten glass; means in said channel for simultaneously exercising both a vertical pumping action within said glass and for creating a pair of over-lapping, oppositely rotating, glass pumping circular motions in said glass arranged serially with respect to the flow of said glass, said means comprising a plurality of means constructed and arranged to cause said glass to be partitioned, a first portion of the glass being carried downstream and a second portion subsequently being carried upstream of said flow channel.

11. A method of homogenizing molten glass comprising the steps of flowing the molten glass in a confined channel through a pair of oppositely rotating, overlapping, glass-pumping circular motions arranged serially with respect to the flow of said glass, whereby said glass will be partitioned, resulting in a first portion of the glass being carried downstream and a second portion subsequently being carried upstream of said channel; and simultaneously imparting to said glass a vertical motion.

12. The method of claim 11 wherein said vertical motion is imparted to said glass substantially at the overlap of said circular motions.

13. The method of claim 12 wherein said circular motions are disposed substantially in the center of said channel and extend to points adjacent the sides of said channel.

14. A method of homogenizing molten glass comprising the steps of flowing the molten glass in a confined channel through a pair of oppositely rotating, overlapping, glass-pumping circular motions arranged serially with respect to the flow of said glass, the planes of said motions being positioned at acute angles to one another, whereby said glass will be partitioned, resulting in a first portion of the glass being carried downstream and a second portion subsequently being carried upstream of said channel.

References Cited in the file of this patent

UNITED STATES PATENTS

| | | |
|---|---|---|
| 877,066 | Fay | Jan. 21, 1908 |
| 1,678,232 | Soubier | July 24, 1928 |
| 2,115,408 | Brosse | Apr. 26, 1938 |
| 2,467,809 | Cannon et al. | Apr. 19, 1949 |
| 2,707,621 | Peiler | May 3, 1955 |
| 2,750,161 | Simmons | June 12, 1956 |

FOREIGN PATENTS

| | | |
|---|---|---|
| 41,254 | France | Aug. 30, 1932 |
| | (Addition to 711,976) | |
| 371,190 | Great Britain | Apr. 21, 1932 |